Aug. 7, 1956  P. V. L. SALMINEN  2,757,956
DEVICE FOR DISCHARGING FLUIDS
Filed Dec. 27, 1951  7 Sheets-Sheet 2

INVENTOR.
Paavo Viktor Ludvig Salminen
BY
Michael S. Striker
agt.

Aug. 7, 1956 P. V. L. SALMINEN 2,757,956
DEVICE FOR DISCHARGING FLUIDS
Filed Dec. 27, 1951 7 Sheets-Sheet 3

INVENTOR.
Paavo Viktor Ludvig Salminen
BY
Michael S. Striker
agt.

Aug. 7, 1956     P. V. L. SALMINEN     2,757,956
DEVICE FOR DISCHARGING FLUIDS
Filed Dec. 27, 1951     7 Sheets-Sheet 4

INVENTOR.
Paavo Viktor Ludvig Salminen
BY
Michael S. Striker
agt.

Aug. 7, 1956     P. V. L. SALMINEN     2,757,956
DEVICE FOR DISCHARGING FLUIDS

Filed Dec. 27, 1951     7 Sheets-Sheet 5

INVENTOR.
Paavo Viktor Ludvig Salminen
BY
Michael S. Striker
agt.

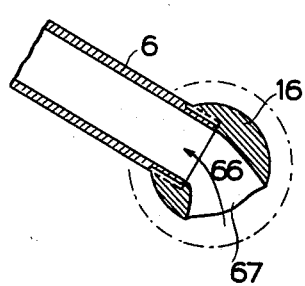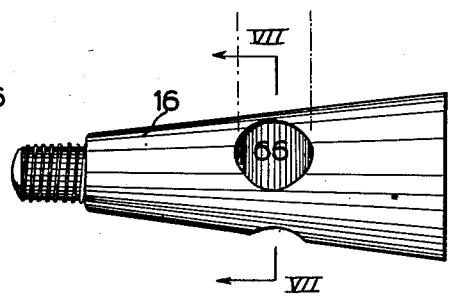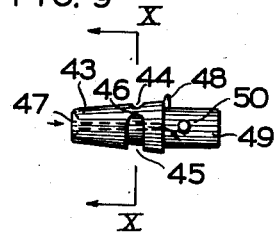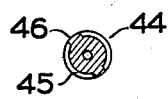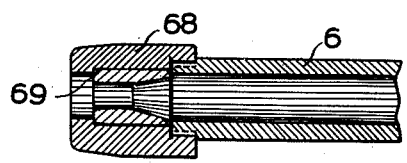

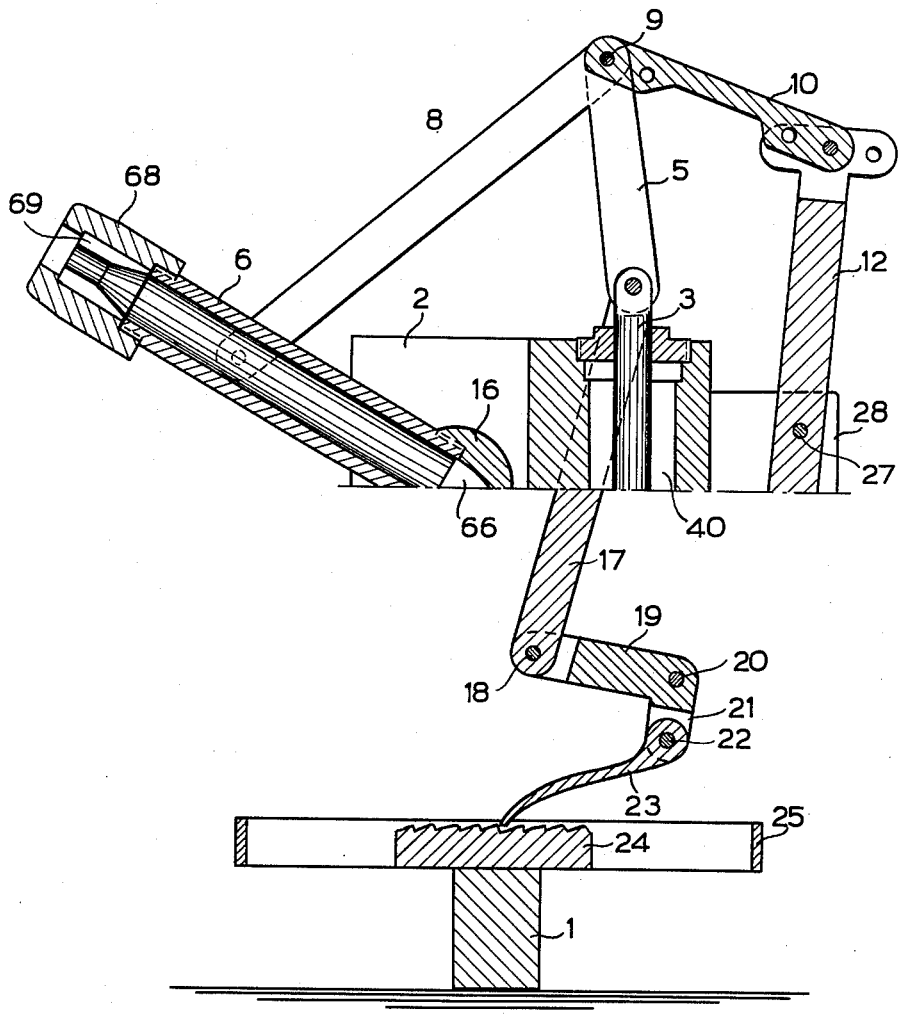

United States Patent Office 2,757,956
Patented Aug. 7, 1956

2,757,956

DEVICE FOR DISCHARGING FLUIDS

Paavo Viktor Ludvig Salminen, Helsinki, Finland

Application December 27, 1951, Serial No. 263,595

7 Claims. (Cl. 299—18)

The present invention relates to a device for spraying or discharging fluids and more particularly, to a device of such character which rotates.

It is an object of the present invention to provide an irrigation device which permits water to be evenly distributed over a given area, all portions of the given area receiving essentially the same quantity of water.

It is another object of the present invention to provide a highly efficient irrigating device of simple yet sturdy construction which may be easily operated and maintained.

It is a further object of the present invention to provide a discharge device which permits fluids to be directed upon a given area in rectangular or quadratic patterns.

With the above objects in view, the present invention mainly consists of a device for spraying fluid, comprising a combination, a stationary base member upon which a rotatable body having a nozzle is mounted. The nozzle is movable relative to the rotatable body between a raised and lowered position. Conduit means pass through the rotatable body and connect to the nozzle for admitting fluid under pressure to the nozzle. Actuating means is provided located in the rotatable body. The actuating means is associated with the conduit means and is operated by the conduit means during the passage of the fluid under pressure through the conduit means. Rotating means is provided which is operated by the actuating means and rotates the rotatable body relative to the base member during the passage of the fluid through the conduit means. Moving means is provided which is operated by the said actuating means for continuously moving the nozzle relative to the rotatable body with a retarded speed as a nozzle approaches its lower position and an accelerated speed as the nozzle approaches its raised position. Adjusting means is mounted on said rotatable body for adjusting the limits of the movement of said nozzle between its raised and lowered positions. Operating means is mounted on the base member and engages the adjusting means and operates the same during the rotation of the rotatable body and the nozzle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 7–8 illustrate the attachment of the nozzle;

Figs. 9, 10 show the regulating or operating valve;

Fig. 11 is a longitudinal sectional view of the spray nozzle; and

Fig. 12 is a sectional view of the device taken along line 12—12 of Fig. 2, in the direction of the arrows showing the arrangement of the driving members.

Figure 1:
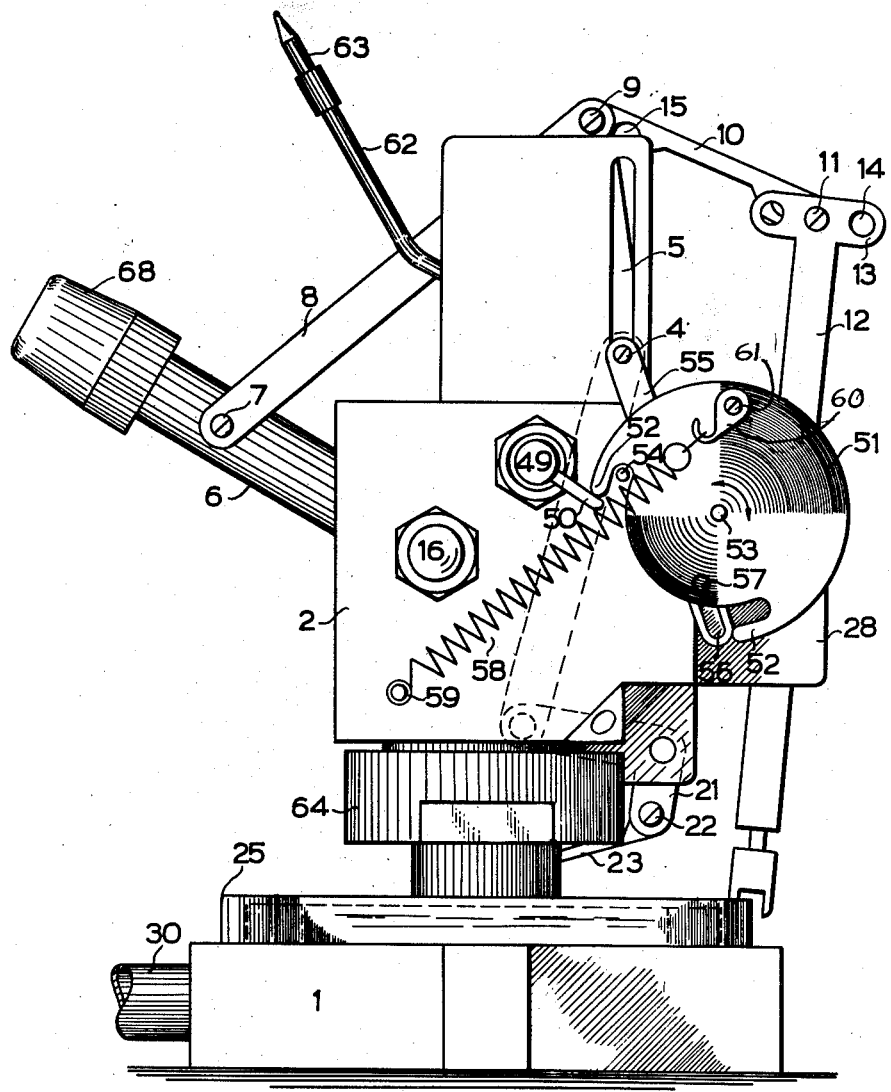
Fig. 1 is a side elevational view of an embodiment of the spraying device of the present invention.
Figure 2:
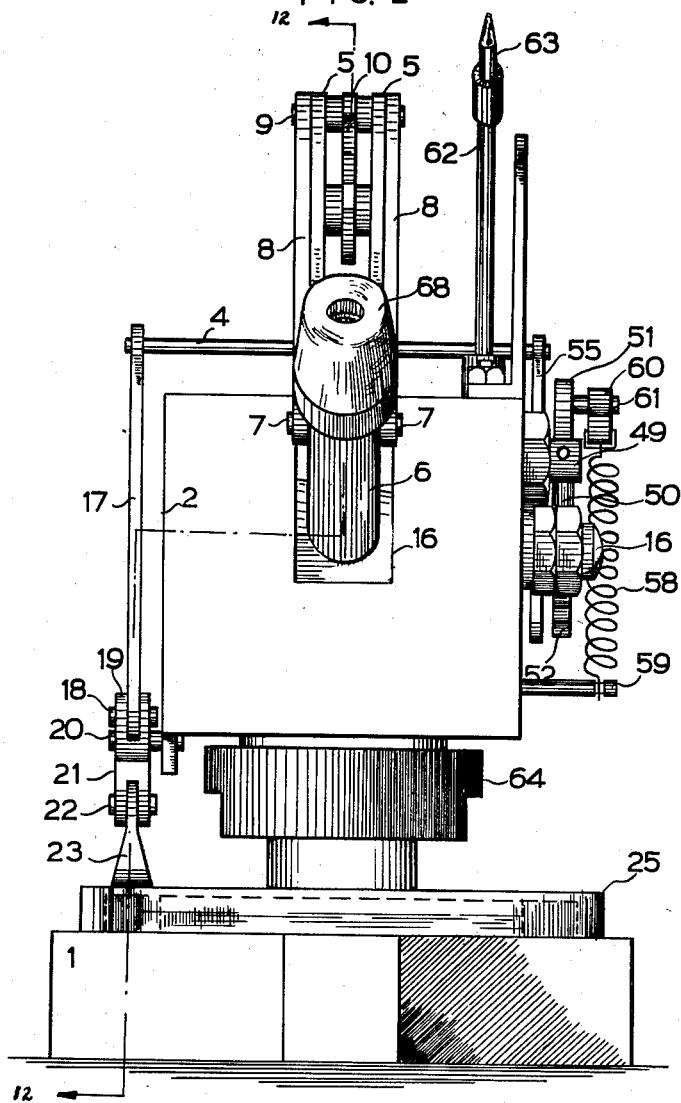
Fig. 2 is a front elevational view of same.
Figure 3:
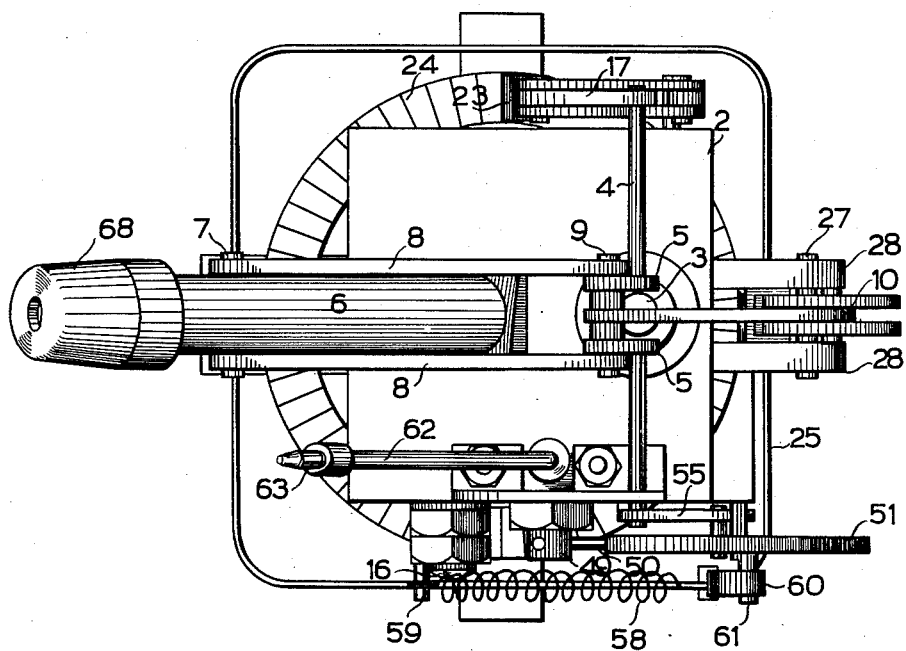
Fig. 3 is a top plan view of same.
Figure 4:
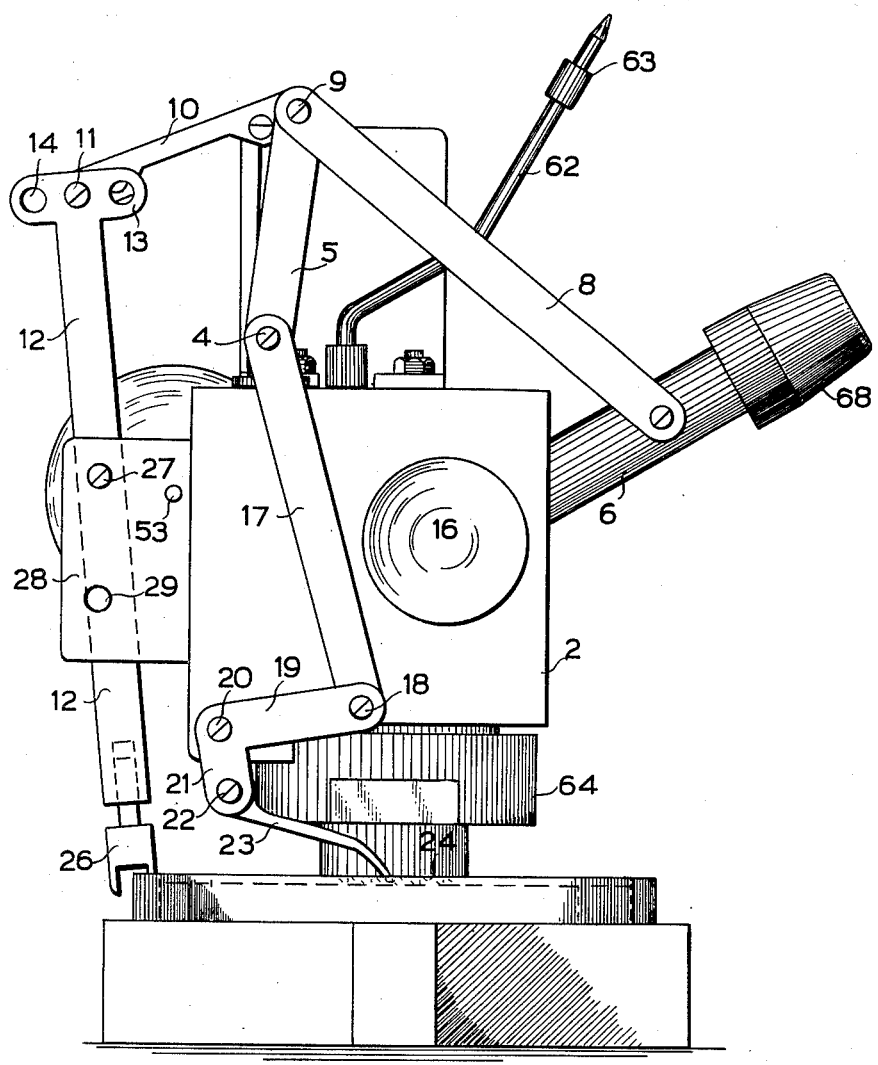
Fig. 4 is another side elevational view of the embodiment shown in Fig. 1.

The construction and operation of the watering device according to the invention is as follows:

Rotatably attached to stationary base member 1 is rotatable body 2, on which a plurality of moving parts are arranged. The moving parts get their driving motion from a piston rod 3 operated by a hydraulic motor, described later, said rod being movable at a uniform velocity. On the upper end of same, arranged on a transverse rod 4, are a plurality of jointed levers. Medially disposed, upwardly drive levers 5 act as driving rods for a toggle lever moving the spray pipe or nozzle 6. The lower ends of jointed levers 8 are attached by means of pins 7 to spray pipe 6. The upper ends of same are joined to drive, or lifting rods 5 and to a shorter lever 10 by means of pin 9. The rear end of lever 10 is joined with a pin 11 to the enlarged upper end 13 of a supporting rod 12, having a plurality of holes 14 for adjusting the supporting point of the lever 10. The lever 10 is also furnished with holes 15 for adjustment of the length of same. The levers 5, 8 and 10 cause the nozzle 6 to be continuously raised and lowered the velocity of the nozzle being at its maximum when the piston rod 3 approaches its highest position, and the velocity of the nozzle 6 being at its minimum when the nozzle 6 and piston rod 3 are in their lowest position. Thus, the velocity of the nozzle gradually decreases as it approaches its lowermost position and gradually increases as it approaches its uppermost position. By reason of this, the spray from nozzle 6 moves towards and away from the centre of an area under irrigation with a greater velocity when nozzle 6 is in the raised position than when the nozzle is in a lowered position. Thus the quantity of water for every unit of surface irrigated will be equal in volume, since the amount of water from the nozzle in a unit of time is constant and ordinarily, the time of spraying increases towards the outer border of the area and vice versa. When nozzles of different size are used to increase or decrease the desired quantity of water per unit of time, the relation between the toggle levers 8, 10 can be changed by means of the adjusting holes 15 in the rod 10. In the same way can the supporting point at the upper end 13 of the supporting rod 12 be adjusted by changing the joint pin 11 in the adjusting holes 14, when at the same time the highest and lowest position of the spray pipe 6 will be adjusted. The spray pipe 6 moves in the vertical plane around its shaft 16.

For directing the spray in uniform quantities about the irrigating device, a rotating means for uniformly rotating the body 2 relative to the base member is provided. The rotating means comprises a downwardly directed rod 17 extending from the end of the transverse rod 4 said rod being attached to a bell crank 19 by means of joint pin 18, the bell crank turning on a joint pin 20 attached to body 2. The shorter arm 21 of said bell crank is provided with a pawl 23 connected to arm 21 by a pin 22. On the base member 1 a circular ratchet 24 is provided which is engaged by the pawl 23. When the piston rod 3 completes one stroke back and forth, the pawl 23 moves one step along the ratchet 24, causing body 2 to rotate a specified number of degrees. In this way an equal distribution of water about the irrigating device is attained.

In all the hitherto known irrigation devices which are based on the rotating spray, the irrigated area is necessarily of circular form. Therefore, with such device, certain areas will be watered in excess while other areas will not receive enough water. To eliminate this drawback the nozzle of my device is caused to move with a varying velocity so that the irrigation pattern is changed from the conventional circular one to a quadratic or rectangular pattern, and by reason thereof no areas are irrigated twice and thus no waste water can occur. A series of quadratic or rectangular irrigation patterns will fit closely together without any overlapping.

The abovementioned quadratic or rectangular irrigating pattern is obtained by continuously moving the nozzle as follows.

A guide rail 25 is mounted upon stationary body 1. Bifurcated member 25, turnably mounted at the lower end of 12, engages guide 25. The supporting rod 12 likewise turns on a pin 27 which projects from member 28 extending from rotatable body 2. When the device is in operation and body 2 is slowly rotating around its axis, bifuracted member 26 moves along guide rail 25 while the rod 12 is pivoted on pin 27 by the movement of nozzle 6. When bifurcated member 26 reaches the corner of rail 25 the nozzle is lowered beneath guide rail 25. At its lowermost position, the nozzle directs the spray farthest away from the device. Thus, as will be realized, the irrigation pattern is always in accordance with the shape of the guiding rail. The guide rail and hence the irrigation pattern can be of any desired shape in accordance with the principles of this invention. Thus, by employing such a system no area can be irrigated twice. If however circular irrigation patterns are desired, bifurcated member 26 is removed from rod 12 and the said rod is additionally fixed to member 28 by means of a second pin 29 whereby it is held in place when the nozzle moves.

Figure 5:
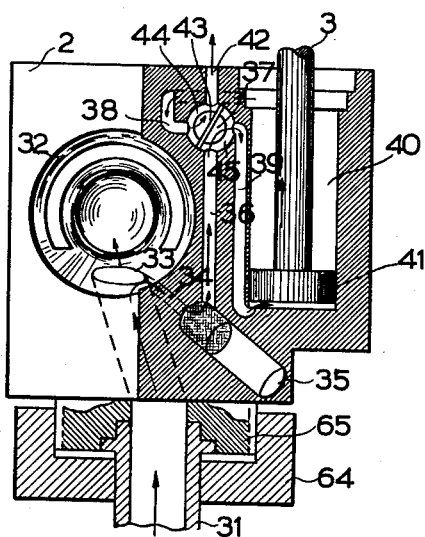
Fig. 5 is a sectional view of the rotating body.
Figure 6:
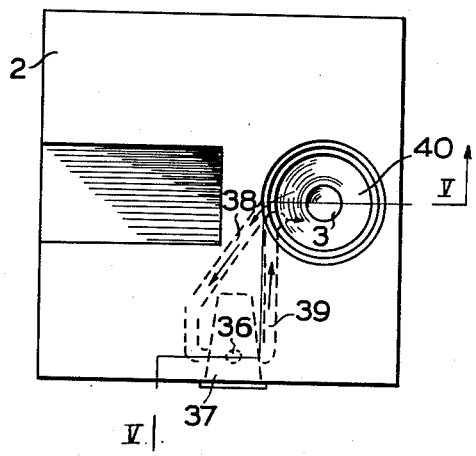
Fig. 6 is a plan of same.

The construction and operation of the hydraulic motor of the device is as follows: Water under pressure is led through conduit 30 to the stationary body 1 and is then led through tubular conduit 31 formed in stationary body 1 to rotatable body 2. Water passes through opening 33 into chamber 32 (Fig. 5.) At opening 33 a side channel 34 leads to a space 35, fitted with a strainer and closed at its outer end by a plug, a vertical channel 36 leading from said space to a conical opening 37. In this opening there are bored holes in the sides, from which channels 38 and 39 lead to vertical cylinder 40 in the rotatable body, in which a piston 41 attached to the piston rod 3 moves up and down. In the said conical opening 37 is also a bored opening for a channel 42 opposite the channel 36 and in the conical space is placed a conical plug 43 acting as a distributing slide or valve for the motor. The form of the slide is shown on Figs. 9 and 10. The plug or slide has side channels 44 and 45 so deep that between the same is left a wallformed part 46. In the plug 43 is bored in the middle a hole 47 open at its both ends to prevent a hydraulic pressure at its ends so that the plug can easily be turned. The turning motion of the plug is limited by a plug 48 fixed thereto in known manner. On shaft 49 of the plug is fixed an outwards pointing steering pin 50. The valve plug gets the motion back and forth from a turning disc 51 (Fig. 1), the points 52 of same alternately striking the steering pin 50 of the plug. The turning disc 51, which can make its back and forth swinging rotary motion around a control pin 53 and whose motion is limited by a pin 54 attached to the auxiliary body, gets its motion from a push-and-pull rod 55, joined to the transverse rod 4 of the piston rod 3, the lower end of said push-and-pull rod having a slot 56, in which the driving pin 57 of the turning disc is able to move a distance of the length of the slot. In the position shown in Fig. 1 the piston rod is in its lowest position and the push rod 55 has pushed from the pin 57 the turning disc 51 to its one limit and the slide plug 43, 49 is turned as shown in Figs. 1 and 5. The turning disc 51 is moved to its limit positions by a spring 58, the one end of which is fixed to a pin 59 in the auxiliary body and the other end with the aid of hook 60 to the pin 61. The spring device operates in known manner as soon as the pin 61 passes the imaginary line drawn through the centre 53 of the turning disc and the fixed pin 59. According to Fig. 5 is the slide in a such position, that the water under pressure flows from the channel 36 to the slide channel 45 and from there via the vertical channel 39 below the piston 41 putting the piston in motion upwards. From above the piston the water in the cylinder escapes correspondingly along the side channel 38 to the channel 44 of the slide and from there further through the channel 42 out to the outlet pipe 62 (Figs. 1–4), on the outer end of which is small calibred, interchangeable spray nozzle 63, the opening of same determining the outflowing velocity of water and thus the stroke velocity of the piston. The difference in pressure thus created on both sides of the piston forms the driving power of the motor. As soon as the piston reaches its upper position the turning disc 51 swings to its other limit position and the slide turns so that the water flows out from beneath the piston and into the cylinder above the piston. The motion is thus entirely even and the velocity of same constant. The velocity is regulated by changing the nozzle 63 in a greater or smaller one. By this means also the quantity of water sprayed under one round can be regulated corresponding to the suction capacity of the soil. The water sprayed from the nozzle 63 irrigates the soil nearest around the device. The auxiliary body is held on its place by a nut 64 arranged around the shaft of the base body body (Fig. 5), said nut encircling the extension 65 of the auxiliary body around the joint of the water channel 31.

The spray pipe 6 is fixed with threads to a conical shaft 16 of known tap-plug form, moving in a corresponding opening 32 in the auxiliary body. The shaft plug has a water passage 66, the open end 67 of same being made elliptical so that the flow of water through the hole 33 in the conical opening 32 is entirely free in every position of the plug and thus also of the spray pipe (Figs. 5, 7). On the outer end of the spray pipe is in known manner arranged an interchangeable nozzle 69, fixed with a bush 68, said nozzle made either of metal, plastic or glass, the friction of the last mentioned against water being very small and thus also the loss of pressure being very little.

It will be understood that each of the elements described above, or two or more together, may also find a useful application in other types of fluid discharging devices differing from the types described above.

While the invention has been illustrated and described as embodied in a device for discharging fluids, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for spraying fluid, comprising, in combination, a stationary base member; a rotatable body rotatably mounted on said base member; a nozzle on said rotatable body movable relative thereto between a raised and a lowered position; conduit means passing through said body and connected to said nozzle for admitting fluid under pressure thereto; actuating means in said rotatable body associated with said conduit means and operated by the same during passage of fluid under pressure through said conduit means; rotating means operated by said actuating means for rotating said rotatable body relative to said base member during passage of fluid through said conduit means; moving means operated by said actuating means for continuously moving said nozzle relative to said rotatable body with a retarded speed as it approaches its lowered position and an accelerated speed as it approaches its raised position; adjusting means mounted on said rotatable body for adjusting the limits of the movement of said nozzle between its raised and lowered positions; and operating means mounted on said base member engaging said adjusting means and operating the same during rotation of said rotatable body together with said nozzle.

2. A device for spraying fluid, comprising, in combination, a base member; a rotatable body rotatably mounted on said base member; a nozzle on said rotatable body movable relative thereto between a raised and a lowered position; conduit means passing through said body and connected to said nozzle for admitting fluid under pressure thereto; actuating means in said rotatable body associated with said conduit means and operated by the same during passage of fluid under pressure through said conduit means; moving means operated by said actuating means for continuously moving said nozzle relative to said rotatable body with a retarded speed as it approaches its lowered position and an accelerated speed as it approaches its raised position; and rotating means operated by said actuating means for rotating said rotatable body relative to said base member during passage of fluid through said conduit means, whereby said nozzle is continuously moved relative to said rotatable body during rotation of said rotatable body.

3. A device for spraying fluid, comprising, in combination, a stationary base member; a rotatable body rotatably mounted on said base member; a nozzle pivotally mounted on said rotatable body so as to be movable relative thereto in an arc between a raised and a lowered position; conduit means passing through said body and connected to said nozzle for admitting fluid under pressure thereto; actuating means in said rotatable body associated with said conduit means and operated by the same during passage of fluid under pressure through said conduit means; moving means operated by said actuating means for continuously moving said nozzle relative to said rotatable body with a retarded speed as it approaches its lowered position and an accelerated speed as it approaches its raised position, said moving means including pivoted link means connected to said nozzle and inclinable at different angles relative to each other; rotating means operated by said actuating means for rotating said rotatable body relative to said base member during passage of fluid through said conduit means; adjusting means mounted on said rotatable body for adjusting the limits of the movement of said nozzle between its raised and lowered positions, said adjusting means comprising pivoted arm means connected to said pivoted link means of said moving means for inclining the same at different angles to raise or lower said nozzle; and guide means mounted on said base member engaging said adjusting means for operating the same during rotation of said rotatable body together with said nozzle, so that said nozzle is automatically adjusted during rotation of said rotatable body and nozzle depending upon the position of the same relative to said base member.

4. A device for spraying fluid, comprising, in combination, a base member; a rotatable body mounted on said base member; a nozzle pivotally mounted on said rotatable body so as to be movable relative thereto in an arc between a raised and a lowered position; conduit means passing through said body and connected to said nozzle for admitting fluid under pressure thereto; actuating means in said rotatable body associated with said conduit means and operated by the same during passage of fluid under pressure through said conduit means; moving means operated by said actuating means for continuously moving said nozzle relative to said rotatable body with a retarded speed as it approaches its lowered position and an accelerated speed as it approaches its raised position, said moving means including pivoted link means connected to said nozzle and inclinable at different angles relative to each other; rotating means operated by said actuating means for rotating said rotatable body relative to said base member during passage of fluid through said conduit means; adjusting means mounted on said rotatable body for adjusting the limits of the movement of said nozzle between its raised and lowered positions, said adjusting means comprising pivoted arm means connected to said pivoted link means of said moving means for inclining the same at different angles to raise or lower said nozzle; and endless guide means mounted on said base member extending around the same engaging said adjusting means for operating the same during rotation of said rotatable body together with said nozzle, whereby said nozzle is continuously moved between its raised and lowered positions and is automatically adjusted during rotation of said rotatable body and nozzle depending upon the position of the same relative to said base member.

5. A device for spraying fluid in a predetermined pattern, comprising, in combination, a base member; a rotatable body mounted on said base member rotatable about a vertical axis; a nozzle pivoted on said rotatable body so as to be movable relative thereto in a vertical plane between a raised and a lowered position; conduit means passing through said body and connected to said adjustable nozzle for admitting fluid under pressure thereto; reciprocating means in said rotatable body connected to said conduit means and operated by fluid under pressure passing through said conduit means; rotating means operated by said reciprocating means for rotating said rotatable body relative to said base member; moving means operated by said reciprocating means for continuously moving said nozzle relative to said rotatable body with a retarded speed as it approaches its lowered position and an accelerated speed as it approaches its raised position, said moving means including pivoted link means connected to said nozzle and inclinable at different angles relative to each other; adjusting means mounted on said rotatable body and connected to said moving means for adjusting the limits of movement of said nozzle; and guide means mounted on and extending rectangularly around said base member engaging said adjusting means and adapted to operate the same to differently incline said pivoted link means of said moving means during rotation of said rotatable body, so that the limits of movement of said nozzle are automatically adjusted during rotation of said rotatable body depending upon the position of the same relative to said base member and of the adjusting means relative to said guide means.

6. A device for spraying fluid, comprising, in combination, a base member; a rotatable body rotatably mounted about a vertical axis on said base member; a nozzle pivoted on said rotatable body so as to be movable relative thereto in a vertical plane between a raised and a lowered position; conduit means passing through said body and connected to said adjustable nozzle for admitting fluid under pressure thereto; actuating means in said rotatable body associated with said conduit means and operated by the same during passage of fluid under pressure through said conduit means; moving means operated by said actuating means for continuously moving said nozzle relative to said rotatable body with a retarded speed as it approaches its lowered position and an accelerated speed as it approaches its raised position, said moving means being operable to reciprocate said nozzle in said vertical plane, said moving means including pivoted link means connected to said nozzle and inclinable at different angles relative to each other; and rotating means including pawl means operated by said actuating means for rotating said rotatable body relative to said base member during passage of fluid through said conduit means, whereby said nozzle is vertically reciprocated during rotation of said rotatable body.

7. A device for spraying fluid in a predetermined pattern, comprising, in combination, a base member; a rotatable body mounted on said base member for rotation about a vertical axis; a nozzle pivoted on said rotatable body so as to be movable relative thereto in a vertical plane between a raised and a lowered position; conduit means passing through said body and connected to said adjustable nozzle for admitting fluid under pressure thereto; reciprocating means in said rotatable body connected to said conduit means and operated by fluid under pressure passing through said conduit means; moving means operated by said reciprocating means for continuously moving said nozzle relative to said rotatable body with a retarded speed as it approaches its lowered position and an accelerated speed as it approaches its raised position, said moving means being connected to said nozzle for reciprocably moving the same in said vertical plane, said moving means including pivoted link means connected to said nozzle and inclinable at different angles relative to each other; rotating means including pawl means operated by said reciprocating means for rotating said rotatable body relative to said base member; inclinable arm means pivotally mounted on said rotatable body operable to differently incline said pivoted link means for adjusting the limits of movement of said nozzle; and guide means mounted on and extending rectangularly around said base member, engaging said arm means and adapted to differently incline the same during rotation of said rotatable body, so that the limits of movement of said nozzle are automatically adjusted during rotation of said rotatable body depending upon the position of the same relative to said base member and of the arm means relative to said guide means.

References Cited in the file of this patent
UNITED STATES PATENTS

| | | |
|---|---|---|
| 1,387,165 | Norton | Aug. 9, 1921 |
| 1,454,332 | Norton | May 8, 1923 |
| 1,504,152 | Slack | Aug. 5, 1924 |
| 2,635,007 | Norman | Apr. 14, 1953 |

FOREIGN PATENTS

| | | |
|---|---|---|
| 149,631 | Switzerland | Dec. 1, 1931 |
| 603,579 | Germany | Oct. 8, 1934 |
| 668,614 | France | July 16, 1929 |